(12) United States Patent
Eatough (10) Patent No.: US 7,376,538 B1
(45) Date of Patent: May 20, 2008

(54) SYSTEMS AND METHODS FOR AUDITING THE ACTIONS PERFORMED BY A REMOTE CONTROL OPERATOR DURING A REMOTE CONTROL SESSION

(75) Inventor: David A. Eatough, Herriman, UT (US)

(73) Assignee: LANDesk Software Limited, Dublin (IE)

(*) Notice: Subject to any disclaimer, the term of this patent is extended or adjusted under 35 U.S.C. 154(b) by 243 days.

(21) Appl. No.: 11/132,880

(22) Filed: May 19, 2005

(51) Int. Cl.
*G06F 15/00* (2006.01)

(52) U.S. Cl. .................... 702/188; 702/187
(58) Field of Classification Search ............. 702/188, 702/187; 726/2, 3, 11, 22; 709/224, 227; 370/241
See application file for complete search history.

(56) References Cited

U.S. PATENT DOCUMENTS

| | | | |
|---|---|---|---|
| 5,978,475 A * | 11/1999 | Schneier et al. ............ 713/177 |
| 6,196,846 B1 * | 3/2001 | Berger et al. ............... 434/118 |
| 6,658,465 B1 * | 12/2003 | Touboul .................... 709/223 |
| 6,754,710 B1 | 6/2004 | McAlear | |
| RE38,598 E * | 9/2004 | Frese et al. ................ 709/208 |
| 6,973,569 B1 * | 12/2005 | Anderson et al. .......... 713/156 |
| 2002/0087650 A1 | 7/2002 | Fagerburg et al. | |
| 2003/0212750 A1 * | 11/2003 | Butt .......................... 709/208 |
| 2004/0143702 A1 | 7/2004 | Valdevit | |
| 2004/0249885 A1 * | 12/2004 | Petropoulakis et al. ..... 709/204 |
| 2005/0197904 A1 * | 9/2005 | Baron et al. ................ 705/14 |

OTHER PUBLICATIONS

Remaklus et al., 'Network Based Remote Control of Multiple Satellite Teleports', 1989, IEEE Publication, pp. 1172-1175.*
Duan et al., 'Security Management for Large Computer Networks', 2000, IEEE Publication, pp. 1208-1213.*
Moore et al., 'Architecture of a Network Monitor', 2004, Cambridge Publication, pp. 1-10.*

* cited by examiner

*Primary Examiner*—Edward Raymond
*Assistant Examiner*—Elias Desta
(74) *Attorney, Agent, or Firm*—Madson & Austin (57) ABSTRACT

An exemplary method involves a remote control agent establishing a remote control session with another computer system. In response to the remote control session being established, the remote control agent requests that a monitoring component provide information about activity on the computer system during the remote control session. The monitoring component may be a process monitoring component, a file monitoring component, and/or another type of monitoring component. A logging component creates a log. The monitoring component provides the requested information, and the logging component records the information from the monitoring component in the log.

19 Claims, 10 Drawing Sheets

SYSTEMS AND METHODS FOR AUDITING THE ACTIONS PERFORMED BY A REMOTE CONTROL OPERATOR DURING A REMOTE CONTROL SESSION

TECHNICAL FIELD

The present invention relates generally to computer system administration. More specifically, the present invention relates to systems and methods for efficiently performing tasks related to maintaining and supporting computer systems.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new computer hardware and/or software, or fixing problems with existing systems, may cause downtime during which the business or individual operates at a diminished level. Most individuals and businesses try to minimize computer problems so as to avoid down-time.

When a business or individual is trying to decide whether to make a change to a computer system, the concern about down-time may outweigh the cost of the installation or change in influencing the decision. The professional computer service industry which carries out and supports installations and upgrades has been rapidly expanding. However, even with such computer professional support, the threat of such down-time coupled with the costs of such professional services is a concern.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A method for auditing the actions performed by a remote control operator on a computer system during a remote control session is disclosed. A remote control agent establishes a remote control session with another computer system. In response to the remote control session being established, the remote control agent requests that a monitoring component provide information about activity on the computer system during the remote control session. A logging component creates a log. The log may be uniquely associated with the remote control session. The monitoring component provides the requested information, and the logging component records the information from the monitoring component in the log.

In some embodiments, the monitoring component may be a process monitoring component that monitors the computer system for process-related events. In such embodiments, monitoring the computer system for process-related events may involve hooking calls to system-level functions that are invoked during the process-related events. Alternatively, monitoring the computer system for process-related events may involve obtaining a current process list, and inferring process-related events from differences between the current process list and a previous process list. In alternative embodiments, the monitoring component may be a file monitoring component that monitors the computer system for file-related events.

In some embodiments, the monitoring component may be already running when the remote control session is established. Alternatively, the remote control agent may start the monitoring component in response to the remote control session being established. The remote control agent may request that multiple monitoring components provide the information about the activity on the computer system.

The logging component may filter the information from the monitoring component before recording the information in the log. In some embodiments, the logging component may secure the log.

In some embodiments, the computer system is a managed node within a computer network, and the remote control session is established with an administrative system for the computer network. In such embodiments, the log may be created on the administrative system. Alternatively, or in addition, the log may be created on the managed node.

A computer system that is configured to implement the method described above is also disclosed. The computer system includes a processor and memory in electronic communication with the processor. The computer system also includes a remote control agent, a logging component, and a monitoring component. Instructions are stored in the memory. The instructions are executable to implement the method described above. A computer-readable medium comprising executable instructions for implementing the method described above is also disclosed.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Figure 1:
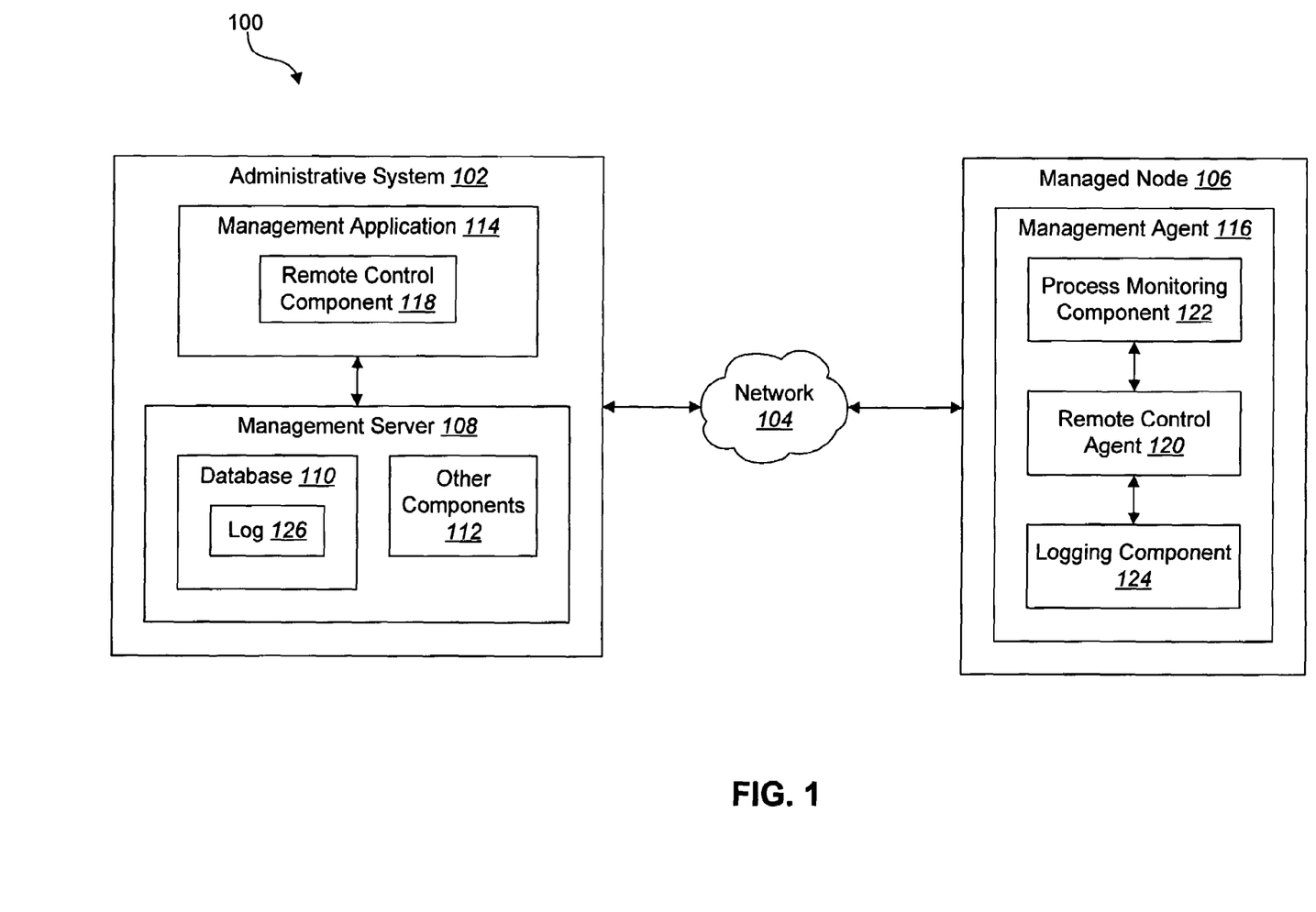
FIG. 1 illustrates an exemplary system in which some embodiments may be practiced, the system including a remote control agent, a process monitoring component, and a logging component.

FIG. 1 illustrates an exemplary system 100 in which some embodiments may be practiced. An administrative computer system 102 is connected to a computer network 104, such as a corporate local area network (LAN). The administrative system 102 is used to manage other computer systems that are also connected to the computer network 104. These other computer systems will be referred to herein as "managed nodes." For simplicity, only a single managed node 106 is shown in the system 100 of FIG. 1. Of course, the systems in which embodiments disclosed herein are practiced may include many additional managed nodes.

The administrative system 102 includes a management server 108. The management server 108 may include a database 110 of information. The management server 108 may also include various other components 112 that are configured to perform tasks such as scheduling, handling alerts, and so forth. An example of a management server 108 that may be used with embodiments disclosed herein is the core server for the LANDesk® Management Suite.

The administrative system 102 also includes a management application 114. The management application 114 may be used to perform various tasks related to the management of the computer network 104, such as remote control, software distribution, software license monitoring, operating system imaging and migration, IT asset management, problem resolution, and so forth. As part of performing these tasks, the management application 114 may connect to the management server 108 and query the management server 108 for information. An example of a management application 114 that may be used is the console application for the LANDesk® Management Suite.

To enable a user of the administrative system 102 to perform management tasks via the management application 114, the managed node 106 includes a management agent 116. The management agent 116 performs management-related tasks in response to requests from the management application 114.

As indicated above, one of the tasks performed by a user of the administrative system 102 (e.g., a network administrator or help desk operator) may be remote control of a managed node 106. When a user of the administrative system 102 remotely controls a managed node 106, the user of the administrative system 102 may be able to view and control the desktop of the managed node 106. To facilitate remote control, the management application 114 includes a remote control component 118, and the management agent 116 includes a remote control agent 120. The remote control component 118 and the remote control agent 120 work together to allow the user of the administrative system 102 to remotely control the managed node 106. A connection between the remote control component 118 and the remote control agent 120 that facilitates remote control of the managed node 106 may be referred to herein as a "remote control session."

In many cases, the managed node 106 that is being remote controlled includes sensitive information such as trade secrets, legal documents, and so on. It is often important to make sure that the sensitive information on the managed node 106 is protected from misuse. However, an unscrupulous remote control operator may access a managed node 106 using remote control technology, gain access to sensitive information, and then misuse the sensitive information.

Advantageously, the system 100 shown in FIG. 1 provides the ability to audit the actions performed by a remote control operator during a remote control session. Thus, if inappropriate actions are performed with respect to the sensitive information on the managed node 106, the responsible party may be more easily identified. This functionality may deter some individuals from inappropriately using remote control technology to gain unauthorized access to sensitive information.

In the system 100 shown in FIG. 1, the ability to audit a remote control operator's actions is achieved by including a process monitoring component 122 and a logging component 124 in the management agent 116. In general terms, the process monitoring component 122 monitors the managed node 106 for process-related events. The logging component 124 records the information obtained by the process monitoring component 122 in a log 126. In the system 100 shown in FIG. 1, the log 126 is located on the administrative system 102. However, in alternative embodiments one or more logs may be located on the managed node 106 and/or on another computer system that is connected to the network 104. Additional details about the operation of the process monitoring component 122 and the logging component 124 will be provided below.

Figure 2:
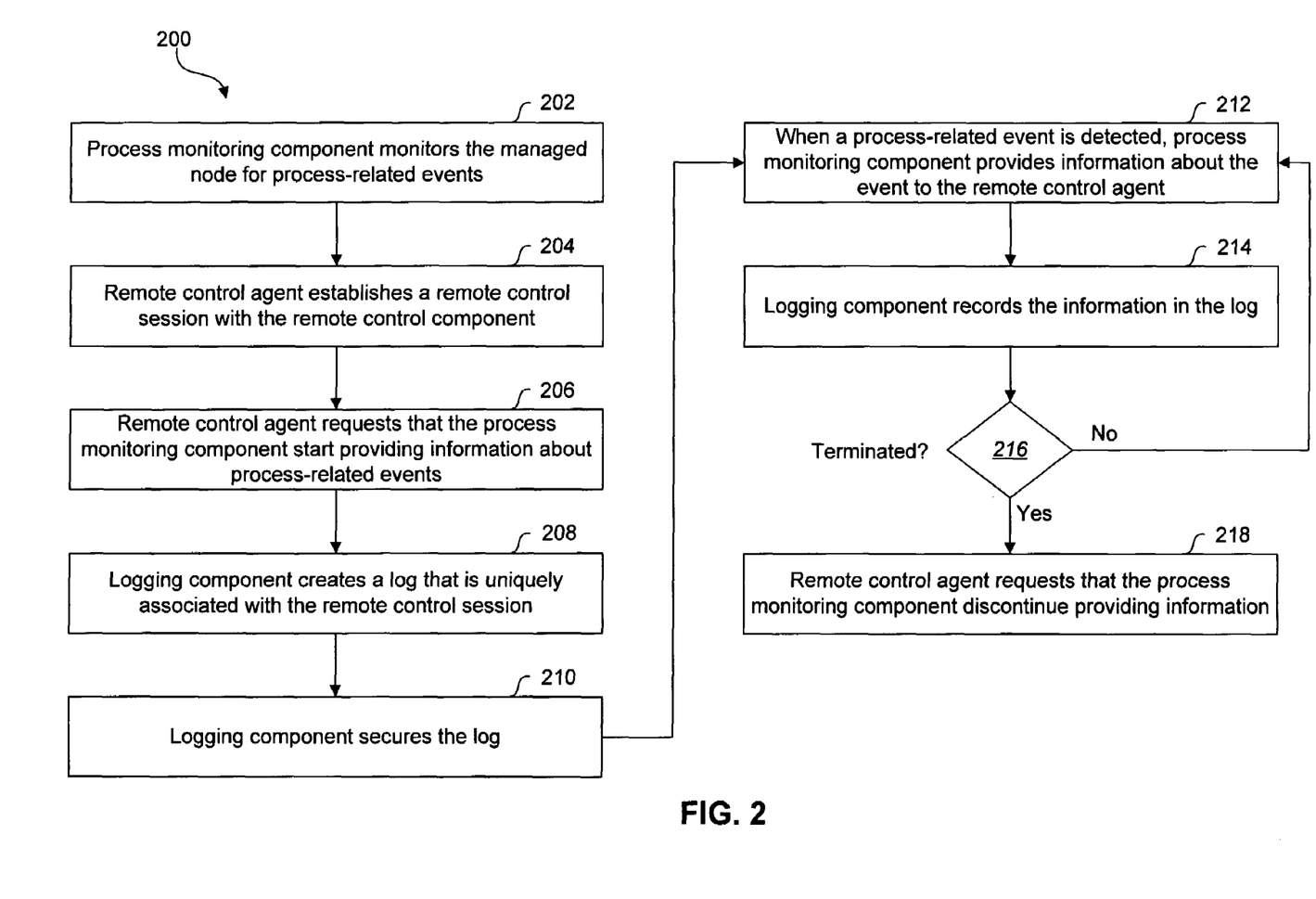
FIG. 2 illustrates a method that may be performed by the remote control agent, the process monitoring component, and the logging component in some embodiments.

FIG. 2 illustrates a method 200 that may be performed by the remote control agent 120, the process monitoring component 122, and the logging component 124 in some embodiments. In the illustrated method 200, the process monitoring component 122 is running even before a remote control session is established. The process monitoring component 122 is monitoring 202 the managed node 106 for process-related events. Some examples of process-related events include a new process being created, an active process being terminated, a library being loaded, and so forth.

At some point, the remote control agent 120 establishes 204 a remote control session with the remote control component 118 on the administrative system 102. This may allow the user of the administrative system 102 to be able to view and control the desktop of the managed node 106.

Steps 206 and 208 are performed in response to the remote control session being established. In step 206, the remote control agent 120 requests that the process monitoring component 122 start providing the remote control agent 120 with the information that it obtains about process-related events occurring on the managed node 106. In step 208, the logging component 124 creates a log 126 that is uniquely associated with the remote control session. As shown in FIG. 1, the log 126 may be created on the administrative system 102. Alternatively, the log 126 may be created on the managed node 106 and/or on another computer system that is connected to the network 104. The logging component 124 may secure 210 the log 126 to prevent unauthorized access. By way of illustration and not limitation, one way for the logging component 124 to secure the log 126 is to have the logging component 124 store the log 126 using different user credentials than the remote control agent 120 is using. This allows the logging component 124 to deny the remote control agent 120 access to the created log files.

When the process monitoring component 122 detects a process-related event, the process monitoring component 122 provides 212 information about the event to the remote control agent 120. The logging component 124 records 214 the information in the log 126 associated with the remote control session.

As long as the remote control session continues, steps 212 and 214 of the method 200 are repeated. In particular, whenever a process-related event is detected, the process monitoring component 122 provides 212 information about the event to the remote control agent 120, and the logging component 124 records 214 the information in the log 126. At some point, the remote control session is terminated 216. When this occurs, the remote control agent 120 requests 218 that the process monitoring component 122 discontinue providing information about process-related events.

Figure 3:
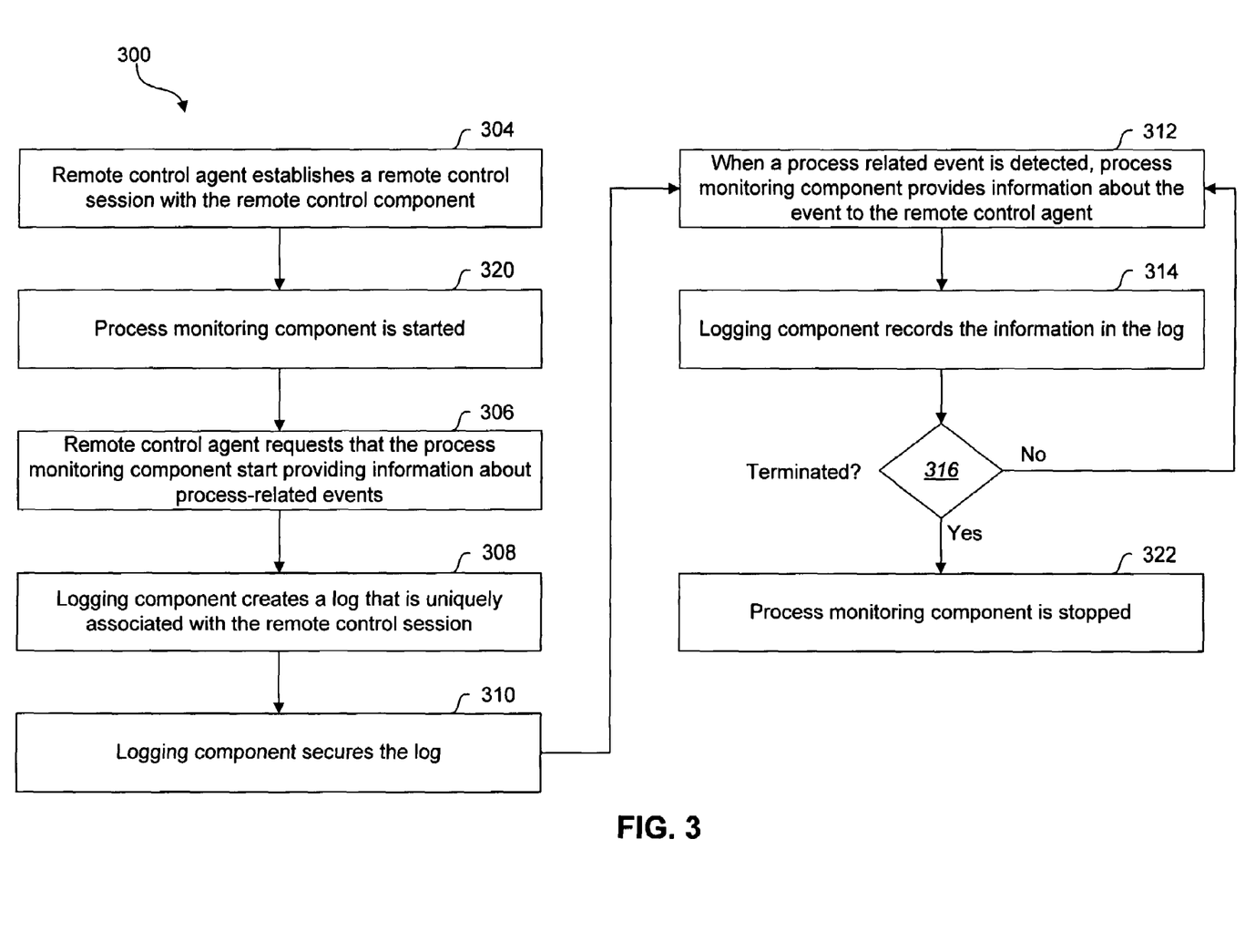
FIG. 3 illustrates another method that may be performed by the remote control agent, the process monitoring component, and the logging component in some embodiments.

FIG. 3 illustrates another method 300 that may be performed by the remote control agent 120, the process monitoring component 122, and the logging component 124 in some embodiments. In the illustrated method 300, the process monitoring component 122 is not running in the background before the remote control session is started. Instead, when the remote control agent 120 establishes 304 a remote control session with the remote control component 118, the remote control agent 120 also starts 320 the process monitoring component 122. Once the process monitoring component 122 is started, it monitors the managed node 106 for process-related events. Steps 306, 308, 310, 312, and 314 of the method 300 are similar to the corresponding steps shown in FIG. 2 and described in connection therewith. When the remote control session is terminated 316, the remote control agent 120 stops 322 the process monitoring component 122.

As indicated above, the process monitoring component 122 monitors the managed node 106 for process-related events. There are many different ways that this may be accomplished. For example, in some embodiments the process monitoring component 122 may hook calls to system-level functions that are invoked during process-related events.

Figure 4:
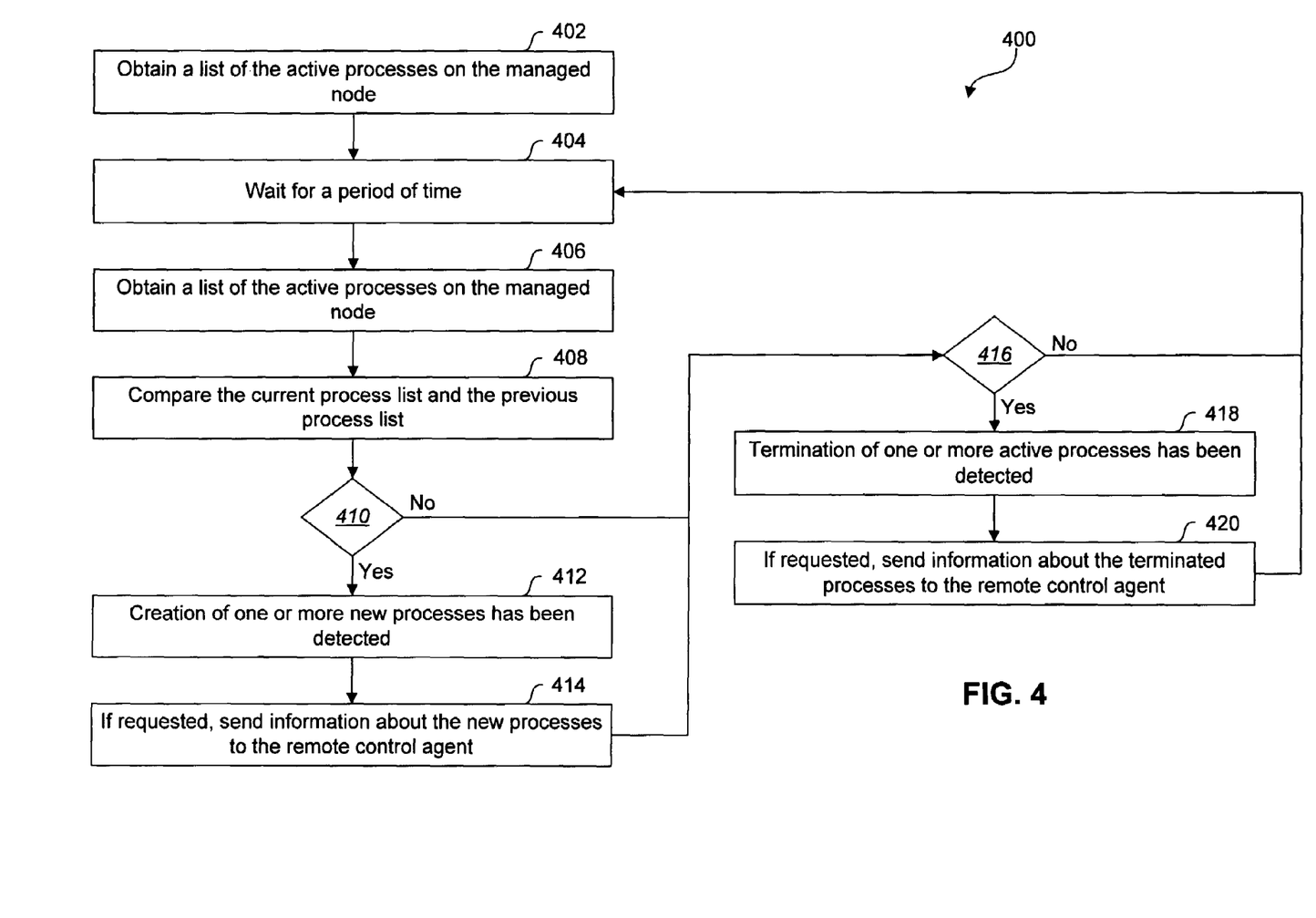
FIG. 4 illustrates a method that may be performed by the process monitoring component in order to obtain information about process-related events on the managed node.

FIG. 4 illustrates another way that the process monitoring component 122 may obtain information about process-related events on the managed node 106. In the illustrated method 400, the process monitoring component 122 periodically identifies the active processes on the managed node 106. More specifically, in step 402 of the method 400, the process monitoring component 122 obtains a list of the active processes on the managed node 106. After waiting 404 for a certain period of time, the process monitoring component 122 once again obtains 406 a list of the active processes on the managed node 106. The process monitoring component 122 then compares 408 the current process list (i.e., the list obtained in step 406) and the previous process list (i.e., the list obtained in step 402 for the first pass through, and the previous list obtained in step 406 on subsequent passes through the flowchart).

Process-related events are inferred from differences between the current process list and the previous process list. More specifically, the process monitoring component 122 determines 410 whether there are any processes included in the current process list that were not included in the previous process list. If so, the creation of one or more new processes has been detected 412. If the remote control agent 120 has requested that the process monitoring component 122 provide this information, the process monitoring component 122 sends 414 information about the new processes that have been created to the remote control agent 120.

The process monitoring component 122 also determines 416 whether any processes that were included in the previous process list are not included in the current process list. If so, the termination of one or more active processes has been detected 418. If the remote control agent 120 has requested that the process monitoring component 122 provide this information, the process monitoring component 122 sends 420 information about the terminated processes to the remote control agent 120. The method 400 then returns to step 404 and proceeds as described above.

If in step 410 it is determined that there are not any new processes included in the current process list, the method 400 proceeds to step 416. If in step 416 it is determined that no processes have been terminated, the method 400 returns to step 404.

In some embodiments, the logging component 124 filters the information that it receives from the process monitoring component 122 before recording the information in the log 126. The system administrator (or other user) may provide filtering criteria which specifies the processes (or types of processes) that the system administrator would like to have monitored. This may be specified using the name of the process (e.g., monitor the process 'application.exe') or by specifying the location from which the process runs (e.g., monitor all processes where the application is under the 'Program Files' directory), or other specifications may be used to identify the processes to be monitored. This filter may be either inclusive, exclusive, or a combination of both. The logging component 124 may use the filtering criteria to discard the information that relates to processes other than those designated by the system administrator as being relevant.

Figure 5:
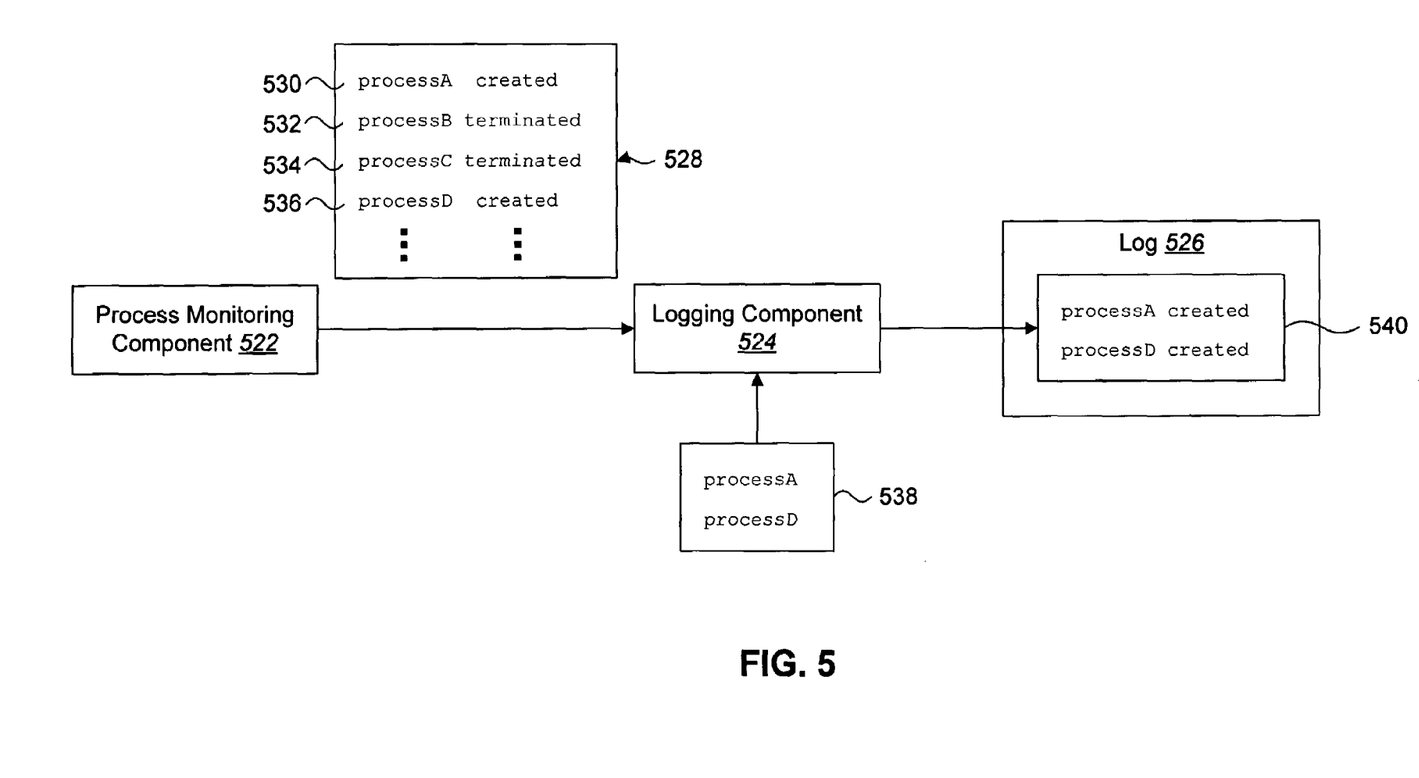
FIG. 5 illustrates an exemplary way that the logging component may filter the information that it receives from the process monitoring component.

FIG. 5 illustrates an exemplary way that a logging component 524 may filter the information that it receives from a process monitoring component 522. In the illustrated embodiment, the process monitoring component 522 sends information 528 about process-related events to the logging component 524. The information 528 shown in FIG. 5 includes a first entry 530 indicating that processA was created, a second entry 532 indicating that processB was terminated, a third entry 534 indicating that processC was terminated, a fourth entry 536 indicating that processD was created, and so on.

The system administrator (or other user) has provided filtering criteria 538. The filtering criteria 538 identifies the processes that the system administrator would like to monitor. In the illustrated embodiment, the filtering criteria 538 indicates that information about processA and processD is relevant. Therefore, the logging component 524 discards the information that does not relate to either processA or processD. The resulting filtered information 540 is then recorded in the log 526.

In the embodiment shown in FIG. 5, the system administrator indicates the processes or types of processes he/she would like to monitor. In alternative embodiments, the system administrator may indicate the processes or types of processes that he/she does not want to monitor. The logging component may then discard any information about these processes.

Figure 6:
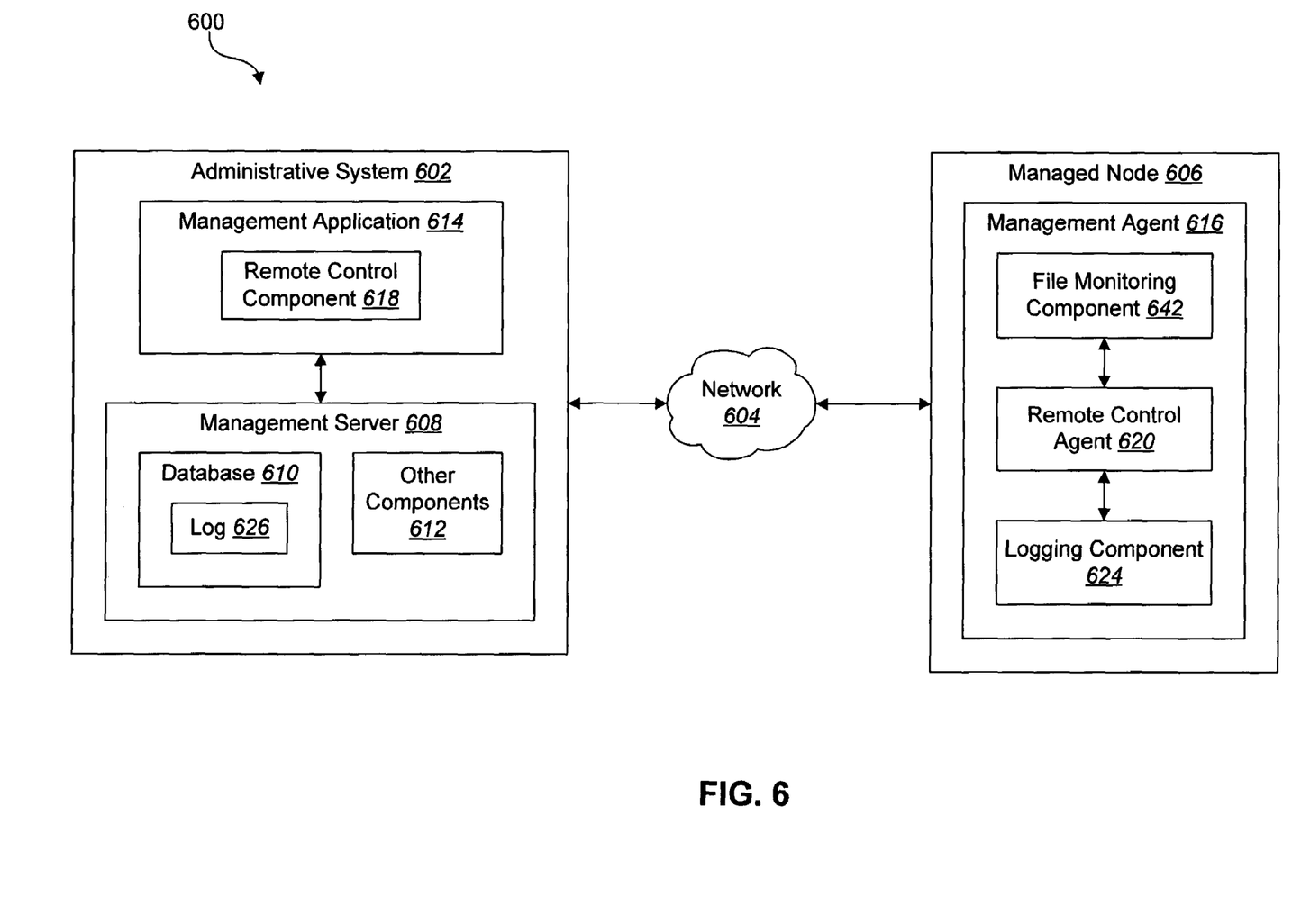
FIG. 6 illustrates another exemplary system in which some embodiments may be practiced, the system including a remote control agent, a file monitoring component, and a logging component.

FIG. 6 illustrates another exemplary system 600 in which some embodiments may be practiced. As before, the system 600 includes an administrative system 602 and a managed node 606 connected to a computer network 604. The administrative system 602 includes a management application 614 and a management server 608. The management application 614 includes a remote control component 618. The management server 608 may include a database 610 and other components 612. The managed node 606 includes a management agent 616, which includes a remote control agent 620.

As before, the system 600 shown in FIG. 6 provides the ability to audit the actions performed by a remote control operator during a remote control session. In the system 600 shown in FIG. 6, however, this functionality is achieved with a file monitoring component 642 instead of a process monitoring component. The management agent 616 also includes a logging component 624, as before. In general terms, the file monitoring component 642 monitors the managed node 606 for file-related events. The logging component 624 records the information obtained by the file monitoring component 642 in a log 626. Additional details about the operation of the file monitoring component 642 and the logging component 624 will be provided below.

Figure 7:
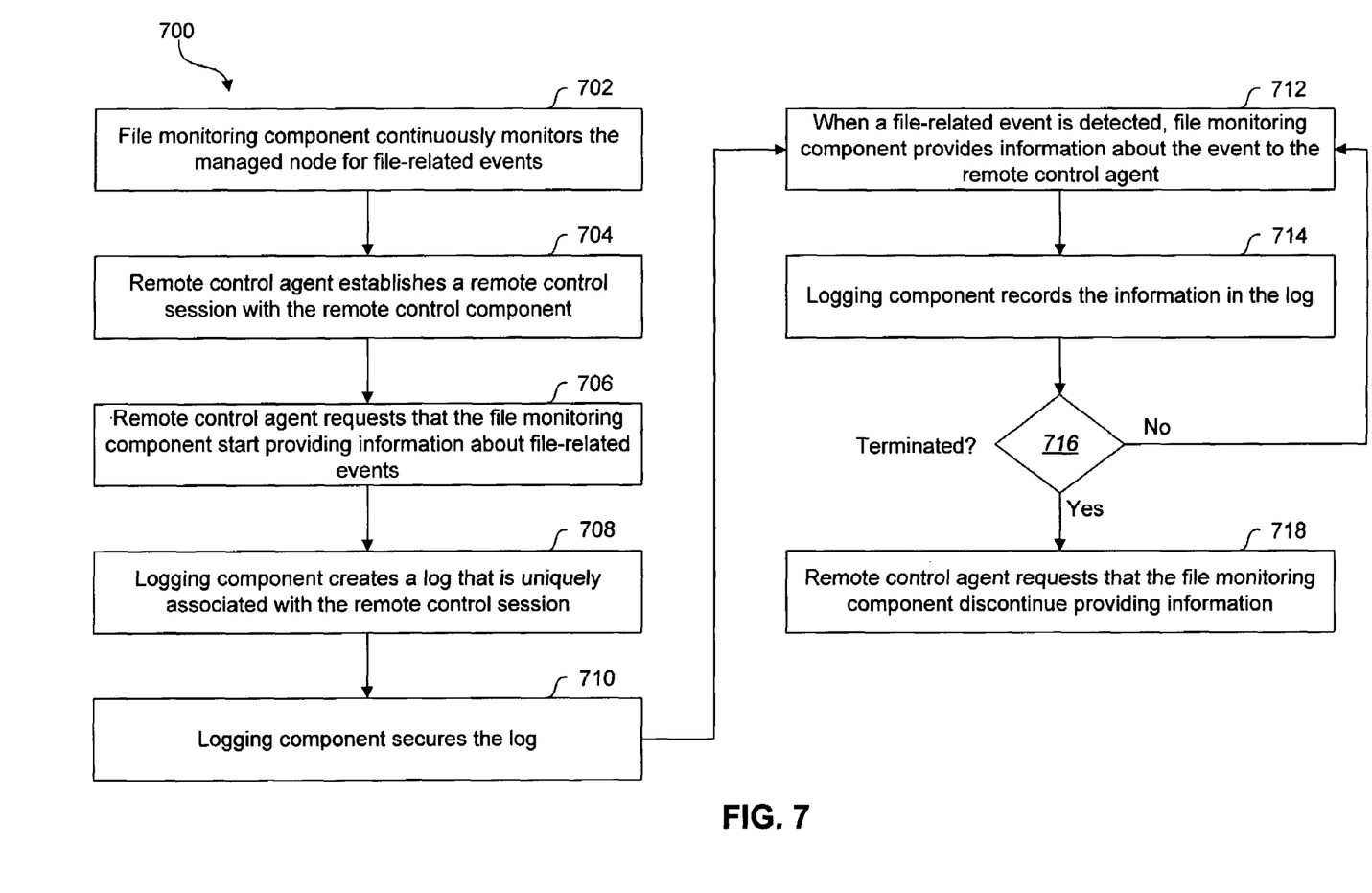
FIG. 7 illustrates a method that may be performed by the remote control agent, the file monitoring component, and the logging component in some embodiments.

FIG. 7 illustrates a method 700 that may be performed by the remote control agent 620, the file monitoring component 642, and the logging component 624 in some embodiments. In the illustrated method 700, the file monitoring component 642 is running even before a remote control session is established. The file monitoring component 642 is monitoring 702 the managed node 606 for file-related events. Some examples of file-related events include a new file being created, an existing file being accessed, modified, or deleted, and so forth.

At some point, the remote control agent 620 establishes 704 a remote control session with the remote control component 618 on the administrative system 602. Steps 706 and 708 are performed in response to the remote control session being established. In step 706, the remote control agent 620 requests that the file monitoring component 642 start providing the remote control agent 620 with the information that it obtains about file-related events occurring on the managed node 606. In step 708, the logging component 624 creates 708 a log 626 that is uniquely associated with the remote control session. The logging component 624 may secure 710 the log 626 to prevent unauthorized access.

When the file monitoring component 642 detects a file-related event, the file monitoring component 642 provides 712 information about the event to the remote control agent 620. The logging component 624 records 714 the information in the log 626 associated with the remote control session.

As long as the remote control session continues, steps 712 and 714 of the method 700 are repeated. In particular, whenever a file-related event is detected, the file monitoring component 642 provides 712 information about the event to the remote control agent 620, and the logging component 624 records 714 the information in the log 626. At some point, the remote control session is terminated 716. When this occurs, the remote control agent 620 requests 718 that the file monitoring component 642 discontinue providing information about file-related events.

Figure 8:
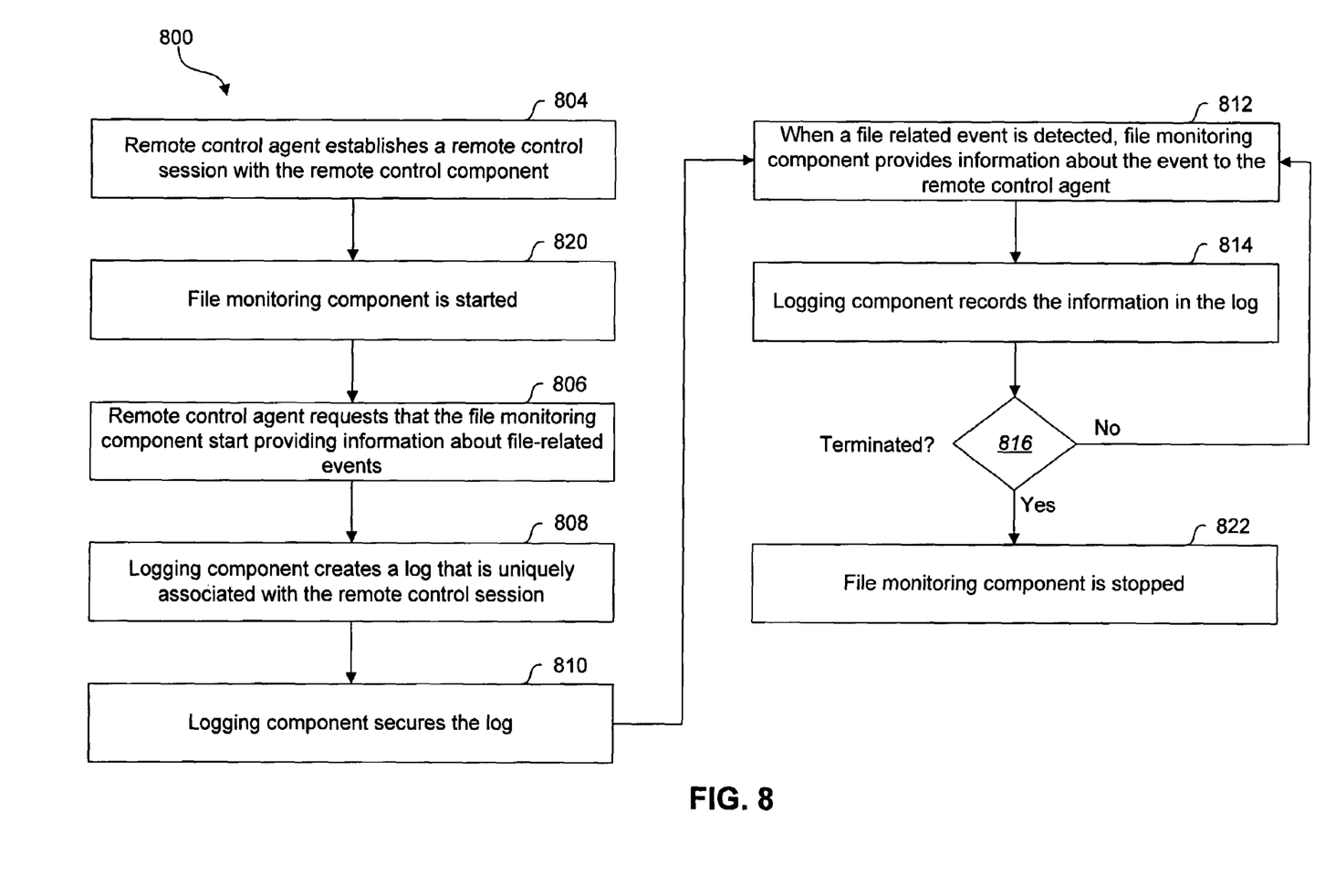
FIG. 8 illustrates another method that may be performed by the remote control agent, the file monitoring component, and the logging component in some embodiments.

FIG. 8 illustrates another method 800 that may be performed by the remote control agent 620, the file monitoring component 642, and the logging component 624 in some embodiments. In the illustrated method 800, the file monitoring component 642 is not running in the background before a remote control session is started. Instead, when the remote control agent 620 establishes 804 a remote control session with the remote control component 618, the remote control agent 620 also starts 820 the file monitoring component 642. Once the file monitoring component 642 is started, it monitors the managed node 606 for file-related events. Steps 806, 808, 810, 812, and 814 of the method 800 are similar to the corresponding steps shown in FIG. 7 and described in connection therewith. When the remote control session is terminated 816, the remote control agent 620 stops 822 the file monitoring component 642.

In some embodiments the logging component 624 may filter the information that it receives from the file monitoring component 642 before recording the information in the log 626. The system administrator (or other user) may provide filtering criteria which specifies the files (or types of files) that the system administrator would like to have monitored. The logging component 624 may use the filtering criteria to discard the information that relates to files other than those designated by the system administrator. This filtering may be specified using the name of the process (e.g., monitor the file 'payroll.xls') or by specifying the parent directory where the file resides (e.g., monitor all files under the 'My Documents' directory), or other specifications may be used to identify the files to be monitored. This filter may be either inclusive, exclusive, or a combination of both. An example of a combination filter would be to monitor all files under 'My Documents' except those named 'readme.txt'.

Figure 9:
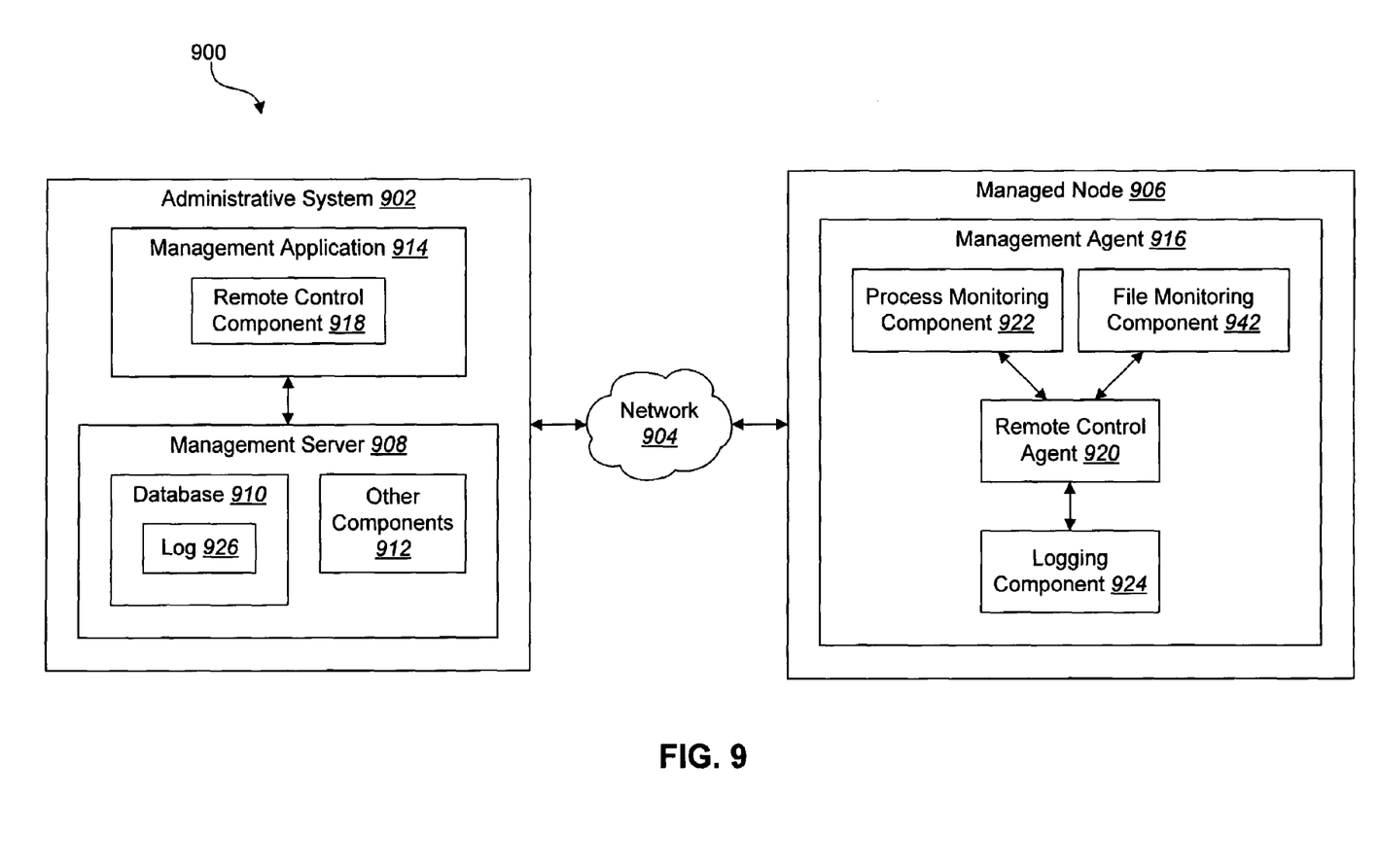
FIG. 9 illustrates another exemplary system in which some embodiments may be practiced, the system including a remote control agent, a process monitoring component, a file monitoring component, and a logging component.

FIG. 9 illustrates another exemplary system 900 in which some embodiments may be practiced. As before, the system 900 includes an administrative system 902 and a managed node 906 connected to a computer network 904. The administrative system 902 includes a management application 914 and a management server 908. The management application 914 includes a remote control component 918. The management server 908 may include a database 910 and other components 912. The managed node 906 includes a management agent 916, which includes a remote control agent 920.

As before, the system 900 shown in FIG. 9 provides the ability to audit the actions performed by a remote control operator during a remote control session. In the system 900 shown in FIG. 9, this functionality is achieved with both a process monitoring component 922 and a file monitoring component 942, in addition to a logging component 924. As discussed above, the process monitoring component 922 monitors the managed node 906 for process-related events. The file monitoring component 942 monitors the managed node 906 for file-related events. The logging component 924 records the information obtained by the process monitoring component 922 and the file monitoring component 942 in a log 926.

In the embodiments described herein, the remote control agent, the monitoring components, and the logging component have been used within a management agent that is running on a managed node. However, these components may be used in a wide variety of other operating environments. Indeed, these components may be used in any computer system that may be remotely controlled by another computer system.

In the embodiments described, two types of monitoring components have been used, namely a process monitoring component and a file monitoring component. However, other types of monitoring components may also be used. Indeed, any component that monitors activity on a computer system may be used.

Figure 10:
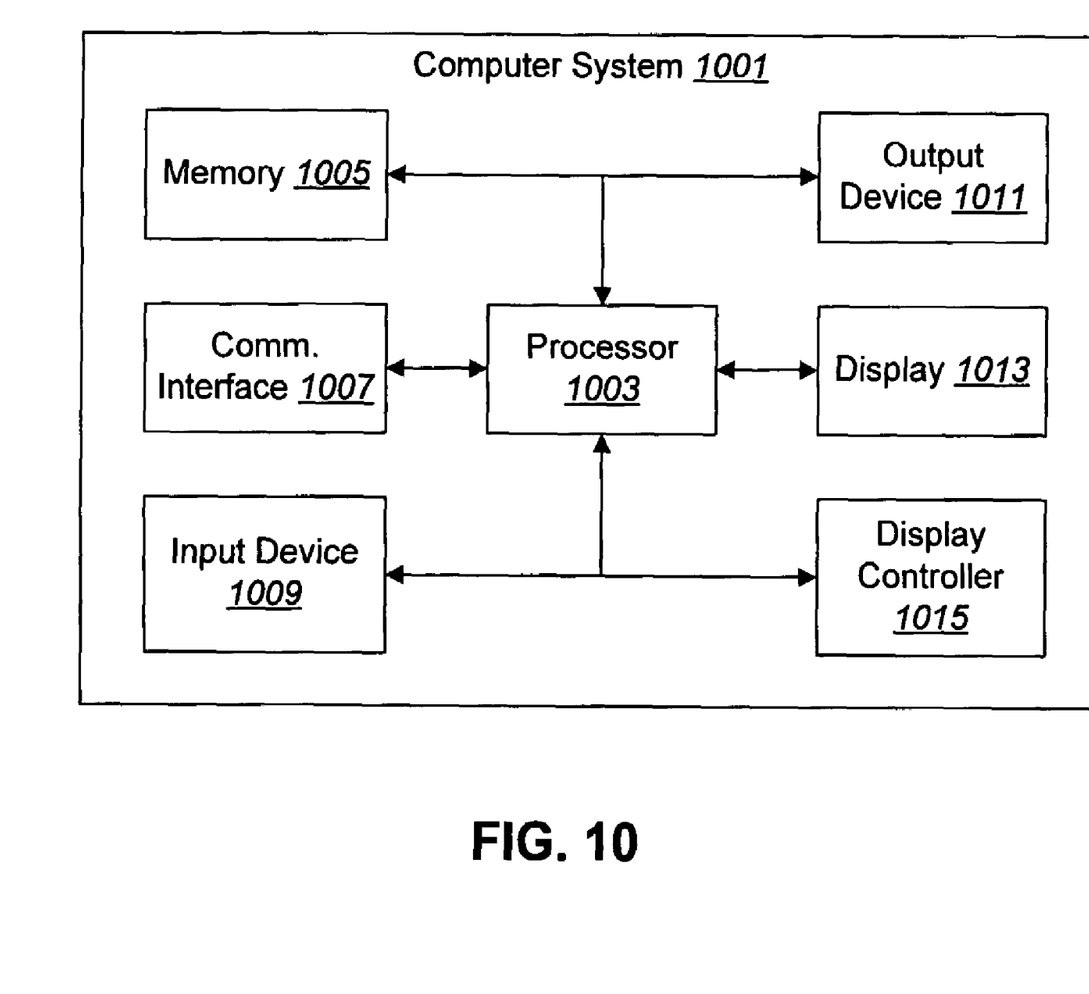
FIG. 10 is a block diagram illustrating the major hardware components typically utilized in a computer system.

FIG. 10 is a block diagram illustrating the major hardware components typically utilized in a computer system 1001, such as a managed node and/or an administrative system. The illustrated components may be located within the same physical structure or in separate housings or structures.

The computer system 1001 includes a processor 1003 and memory 1005. The processor 1003 controls the operation of the computer system 1001 and may be embodied as a microprocessor, a microcontroller, a digital signal processor (DSP) or other device known in the art. The processor 1003 typically performs logical and arithmetic operations based on program instructions stored within the memory 1005.

As used herein, the term memory 1005 is broadly defined as any electronic component capable of storing electronic information, and may be embodied as read only memory (ROM), random access memory (RAM), magnetic disk storage media, optical storage media, flash memory devices in RAM, on-board memory included with the processor 1003, EPROM memory, EEPROM memory, registers, etc. The memory 1005 typically stores program instructions and other types of data. The program instructions may be executed by the processor 1003 to implement some or all of the methods disclosed herein.

The computer system 1001 typically also includes one or more communication interfaces 1007 for communicating with other electronic devices. The communication interfaces 1007 may be based on wired communication technology, wireless communication technology, or both. Examples of different types of communication interfaces 1007 include a serial port, a parallel port, a Universal Serial Bus (USB) port, an Ethernet adapter, an IEEE 1394 bus interface, a small computer system interface (SCSI) bus interface, an infrared (IR) communication port, a Bluetooth wireless communication adapter, and so forth.

The computer system 1001 typically also includes one or more input devices 1009 and one or more output devices 1011. Examples of different kinds of input devices 1009 include a keyboard, mouse, microphone, remote control device, button, joystick, trackball, touchpad, lightpen, etc. Examples of different kinds of output devices 1011 include a speaker, printer, etc. One specific type of output device which is typically included in a computer system is a display device 1013. Display devices 1013 used with embodiments disclosed herein may utilize any suitable image projection technology, such as a cathode ray tube (CRT), liquid crystal display (LCD), light-emitting diode (LED), gas plasma, electroluminescence, or the like. A display controller 1015 may also be provided, for converting data stored in the memory 1005 into text, graphics, and/or moving images (as appropriate) shown on the display device 1013.

Of course, FIG. 10 illustrates only one possible configuration of a computer system. Those skilled in the art will recognize that various other architectures and components may be utilized.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for auditing the actions performed by a remote control operator on a first computer system during a remote control session, comprising:
    a remote control agent on the first computer system establishing a remote control session with a remote control component on a second computer system, wherein during the remote control session the remote control operator views and controls a desktop of the first computer system;
    in response to the remote control session being established, the remote control agent requesting that a monitoring component provide information about activity on the first computer system during the remote control session;
    a logging component creating a log;
    the monitoring component providing the requested information;
    the logging component recording the information from the monitoring component in the log; and
    the logging component securing the log against being accessed by the remote control operator.

2. The method of claim 1, wherein the monitoring component is a process monitoring component that monitors the computer system for at least one of a new process being created, an active process being terminated, and a library being loaded.

3. The method of claim 2, wherein monitoring the computer system for process-related events comprises hooking calls to system-level functions that are invoked during the process-related events.

4. The method of claim 2, wherein monitoring the computer system for process-related events comprises:
    obtaining a current process list; and
    inferring process-related events from differences between the current process list and a previous process list.

5. The method of claim 1, wherein the monitoring component is a file monitoring component that monitors the computer system for at least one of a new file being created and an existing file being accessed, modified, or deleted.

6. The method of claim 1, wherein the remote control agent requests that multiple monitoring components provide the information about the activity on the computer system.

7. The method of claim 1, wherein the log is uniquely associated with the remote control session.

8. The method of claim 1, further comprising the logging component filtering the information from the monitoring component before recording the information in the log.

9. The method of claim 1, wherein the monitoring component is already running when the remote control session is established.

10. The method of claim 1, further comprising the remote control agent starting the monitoring component in response to the remote control session being established.

11. The method of claim 1, wherein the computer system is a managed node within a computer network, and wherein the remote control session is established with an administrative system for the computer network.

12. The method of claim 11, wherein the log is created on the administrative system.

13. The method of claim 11, wherein the log is created on the managed node.

14. A first computer system configured to implement a method for auditing the actions performed by a remote control operator on the first computer system during a remote control session, the first computer system comprising:
    a processor;
    memory in electronic communication with the processor;
    a remote control agent;
    a logging component;
    a monitoring component;
    instructions stored in the memory, the instructions being executable to implement:
        the remote control agent establishing a remote control session with a remote control component on a second computer system, wherein during the remote control session the remote control operator views and controls a desktop of the first computer system;
        in response to the remote control session being established, the remote control agent requesting that the monitoring component provide information about activity on the first computer system during the remote control session;

the logging component creating a log;

the monitoring component providing the requested information;

the logging component recording the information from the monitoring component in the log; and the logging component securing the log against being accessed by the remote control operator.

15. The computer system of claim 14, wherein the monitoring component is a process monitoring component that monitors the computer system for process-related events.

16. The computer system of claim 14, wherein the monitoring component is a file monitoring component that monitors the computer system for file-related events.

17. A computer-readable medium comprising executable instructions for auditing the actions performed by a remote control operator on a first computer system during a remote control session, the instructions being executable to implement:

a remote control agent on the first computer system establishing a remote control session with a remote control component on a second computer system, wherein during the remote control session the remote control operator views and controls a desktop of the first computer system;

in response to the remote control session being established, the remote control agent requesting that a monitoring component provide information about activity on the first computer system during the remote control session;

a logging component creating a log;

the monitoring component providing the requested information;

the logging component recording the information from the monitoring component in the log; and the logging component securing the log against being accessed by the remote control operator.

18. The computer-readable medium of claim 17, wherein the monitoring component is a process monitoring component that monitors the computer system for process-related events.

19. The computer-readable medium of claim 17, wherein the monitoring component is a file monitoring component that monitors the computer system for file-related events.

* * * * *